(12) United States Patent
Gross et al.

(10) Patent No.: US 10,807,464 B2
(45) Date of Patent: Oct. 20, 2020

(54) FILLING DEVICE

(71) Applicant: MAGNA STEYR Fuel Systems GesmbH, Sinabelkirchen (AT)

(72) Inventors: Joerg Gross, Wesseling (DE); Andreas Rehermann, Korschenbroich (DE); Kai Marek, Sebersdorf (AT); Bernd Kahler, Graz (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 72 days.

(21) Appl. No.: 16/159,770

(22) Filed: Oct. 15, 2018

(65) Prior Publication Data

US 2019/0248231 A1 Aug. 15, 2019

(30) Foreign Application Priority Data

Feb. 13, 2018 (EP) .................................... 18156488

(51) Int. Cl.
| | | |
|---|---|---|
| *B60K 15/035* | (2006.01) | |
| *B60K 15/04* | (2006.01) | |
| *B60K 15/03* | (2006.01) | |
| *F02M 37/00* | (2006.01) | |
| *F02M 37/20* | (2006.01) | |

(52) U.S. Cl.
CPC ...... *B60K 15/03519* (2013.01); *B60K 15/035* (2013.01); *B60K 15/04* (2013.01); *B60K 2015/03289* (2013.01); *B60K 2015/03368* (2013.01); *B60K 2015/03538* (2013.01); *B60K 2015/03576* (2013.01);

(Continued)

(58) Field of Classification Search
CPC ........... B60K 2015/03576; B60K 2015/03538; B60K 2015/03368; B60K 2015/03289
See application file for complete search history.

(56) References Cited

U.S. PATENT DOCUMENTS

| | | | | |
|---|---|---|---|---|
| 4,600,041 | A | * 7/1986 | Nishida | ................ B60K 15/061 |
| | | | | 141/326 |
| 4,625,777 | A | * 12/1986 | Schmidt | ........... B60K 15/03504 |
| | | | | 141/286 |

(Continued)

FOREIGN PATENT DOCUMENTS

DE 10131493 A1 1/2002

*Primary Examiner* — Angelisa L. Hicks
(74) *Attorney, Agent, or Firm* — Jordan IP Law, LLC; Todd A. Vaughn

(57) ABSTRACT

A filling device includes a filling pipe to extend into a liquid container for fluidic connection to the liquid container, a filling head operatively connected to the filling pipe, a venting pipe to vent the liquid container, the venting pipe having an open venting pipe section at an end thereof, and an indicator member configured to visually indicate a filling condition of the liquid container. During a filling sequence of the liquid container in a condition in which the liquid container is not full of liquid, the indicator member is to be impinged upon by outflowing air in the venting pipe at a force such that the indicator member assumes a first recognizable condition. During a filling sequence of the liquid container in a condition in which the liquid container is full of liquid, the indicator member is not impinged on by outflowing air in the venting pipe at a force such that the indicator member assumes a second recognizable condition.

18 Claims, 1 Drawing Sheet

(52) U.S. Cl.
CPC ...... *B60Y 2400/92* (2013.01); *F02M 37/0076* (2013.01); *F02M 37/20* (2013.01)

(56) References Cited

U.S. PATENT DOCUMENTS

| | | | |
|---|---|---|---|
| 5,782,258 A * | 7/1998 | Herbon | B60K 15/03519 |
| | | | 137/43 |
| 5,950,688 A | 9/1999 | Langlois | |
| 6,152,196 A | 11/2000 | Kehoe | |
| 6,276,310 B1 * | 8/2001 | Backes | F02D 19/12 |
| | | | 123/1 A |
| 6,729,367 B2 * | 5/2004 | Peterson | B63B 25/082 |
| | | | 137/413 |
| 8,448,665 B1 | 5/2013 | Anderson et al. | |
| 2006/0065459 A1 * | 3/2006 | Nakazawa | B62J 35/00 |
| | | | 180/219 |
| 2007/0289664 A1 | 12/2007 | Peterson et al. | |
| 2015/0152816 A1 * | 6/2015 | Fujiwara | F02M 25/0854 |
| | | | 137/587 |

\* cited by examiner

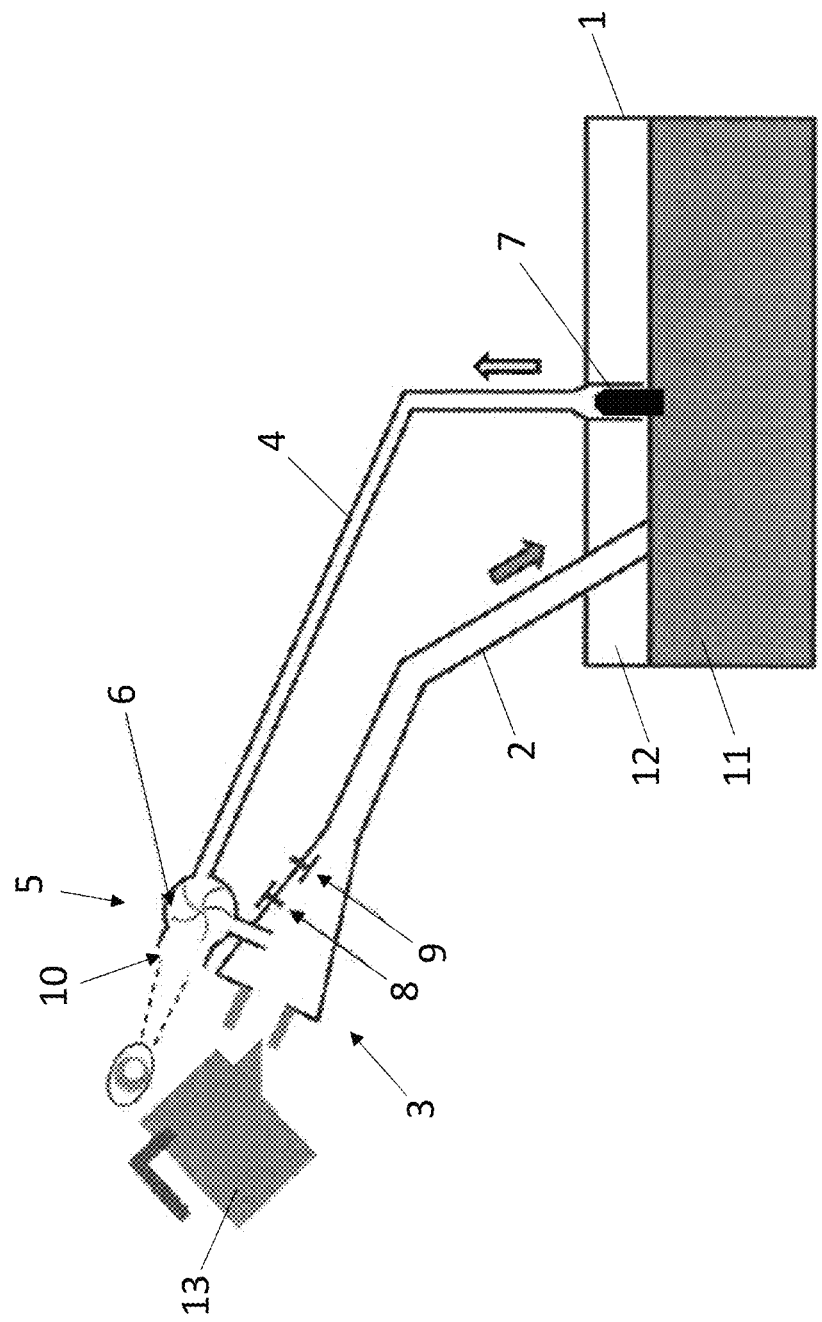

FILLING DEVICE

CROSS-REFERENCE TO RELATED APPLICATIONS

The present application claims priority 35 U.S.C. § 119 to European Patent Publication No. EP 18156488.1 (filed on Feb. 13, 2018), which is hereby incorporated by reference in its entirety.

TECHNICAL FIELD

Embodiments relate to a filling device for a liquid container and a container device comprising a liquid container and a filling device.

BACKGROUND

Liquid containers which are capable of being filled, for example, via a nozzle or by means of canisters or cylinders are sufficiently well-known and are installed, for example, in order to hold fuel and other liquids in motor vehicles. Such liquid containers may be equipped with an aeration and venting system in order to avoid the occurrence of underpressure and overpressure in the container. Such aeration and venting systems may be integrated, for example, on the liquid container itself or in a cover of the liquid container.

To check the filling level and to avoid overfilling of the liquid container, it is known to make a container wall partially transparent. Filling is only possible via a filling pipe, in particular, in liquid containers which are installed behind other vehicle components, such as body parts, and the level of filling of the container is barely visible. Filling may then continue to take place, for example, until the liquid exits at the end of the filling pipe, which is not desirable among other things because of the contamination associated therewith.

SUMMARY

Embodiments relate to a filling device for a liquid container and a container device comprising a liquid container and a filling device, via which overfilling of the liquid container is prevented.

In accordance with embodiments a filling device for a liquid container may comprise a filling pipe configured to extend into the liquid container for fluidic connection to the liquid container; a filling head arranged at a distal end of the filling pipe which faces away from the liquid container; a venting pipe for venting the liquid container, the venting pipe having an open venting pipe section at an end thereof which faces away from the liquid container; and an indicator member configured to visually indicate a filling condition (e.g., "container full") of the liquid container, wherein during filling of the liquid container in a normal state in which the liquid container is not full, the indicator member is to be impinged upon by outflowing air in the venting pipe at a force such that the indicator member assumes a first recognizable condition, and wherein during filling of the liquid container in which the container is full, the indicator member is not impinged on by outflowing air in the venting pipe at a force such that the indicator member assumes a second recognizable condition different from the first recognizable condition.

In accordance with embodiments, a filling device exhibits, in addition to a filling pipe, a second pipe, such as, for example, a venting pipe, configured for fluidic connection to a liquid container. The venting pipe is a separate pipe that may also be physically separated from the filling device.

A filling head of the filling pipe and an open venting pipe section at a distal end of the venting pipe are arranged at the respective end of the two pipes which face away from the container. The filling head of the filling pipe and the open venting pipe section are thus usually situated at a higher level during operation of the filling device, to facilitate flow of a liquid by gravity into the container. The expression "open" end section is used to denote in this case that this end of the venting pipe is open directly or indirectly to the environment, so that gas, in particular, air, may exit from the venting pipe.

The open venting pipe section may be open, in particular, into the filling head and as such is connected to the environment via a filling opening of the filling head. The open venting pipe section may thus merge into the filling head or may constitute a part of the filling head.

An indicator member for indicating a "container full" condition is fluidically connected to the venting pipe in such a way that gas outflowing through the venting pipe, in particular air, causes the indicator member to move into a condition which differs from the condition without the escape of air through the venting pipe. The first condition and the second condition in this case are visually recognizable, so that the difference is visually perceivable by an observer, in particular, by a refueller of the liquid container, and the indicator member is also able to perform the "indication" function. The expression "recognizable" is understood to denote, in particular, an optical recognizability, so that the indicator member constitutes an optical indicator member. Alternatively or additionally, in accordance with embodiments, an acoustic recognisability, and thus, an acoustic indicator member may also be provided. Such a acoustic indicator member is capable of emitting a tone, when impinged on by an air flow in the venting pipe, or a different tone than without an air flow.

In accordance with embodiments, the force of air flow through the venting pipe is thus used in order to indicate the outflow of gas through the venting pipe to a user of the device. This also ensures that such a force only arises if the container is still not full. If the liquid container is full, the occurrence of the force is avoided, in particular, by virtue of the fact the filling device is arranged in such a way that, in the full condition of the liquid container, air no longer is capable of flowing through the venting pipe. In the full condition of the container, the indicator member is thus caused to move recognizably into the second condition, in particular, into a state of rest, and accordingly the "container full" condition is indicated.

In accordance with embodiments, the filling device may be arranged in such a way that the "container full" indication is visually/optically shown when a remaining volume of the liquid container has not yet been filled, so that it is still possible to add a small remaining supply of liquid without overflowing of the container.

In accordance with embodiments, a valve such as, for example, a float valve, may be arranged between the liquid container and the venting pipe so that, in the normal condition, the float valve is open and air is able to escape from the liquid container into the venting pipe. In the "container full" condition, the float valve is closed and air is not able to escape from the liquid container into the venting pipe. The float valve is arranged in such a way that it already closes when a remaining volume of the liquid container may still be used.

In accordance with embodiments, an immersion tube cut-off may be formed on the venting pipe so that the venting pipe is closed by the liquid in the liquid container without the need for a supplementary valve. As a result, in the normal condition, air is once again able to escape from the liquid container into the venting pipe and, in the "container full" condition, air is not able to escape or is able to escape only to a significantly lesser degree from the liquid container into the venting pipe.

In accordance with embodiments, the indicator member may be arranged in the open venting pipe section and/or in or adjacent to the filling head. The indicator member may be a wind wheel, and the first recognizable condition is a standstill or a slower rotation of the wind wheel. The second recognizable condition may be a rotation or a more rapid rotation of the wind wheel. The air flow in the venting pipe is thus used in order to drive the wind wheel in a recognizable manner. The indicator member may also be a lightweight body, in particular, a lightweight ball. The first recognizable condition may be a first position of the lightweight body, and the second recognizable condition may be a second position of the lightweight body different from the first position. The lightweight body may thus be pushed upwards or forwards or backwards, for example, by the air flow in the venting pipe and, if no air flow is present in the "container full" condition, may fall downwards or backwards or forwards by gravity.

In accordance with embodiments, the open venting pipe section may be fluidically connected to the filling head. In particular, air may then escape from the venting pipe through the filling head into the environment.

In accordance with embodiments, an aeration and venting device, in particular, an overpressure relief valve and/or an underpressure relief valve and/or a membrane and/or a dust filter, may be arranged on the filling head. As a result, the liquid container is protected against unacceptable overpressure or underpressure. The ingress of undesirable matter/particulates such as dirt into the liquid container may be avoided by the use of membranes or filters, in particular, dust filters.

In accordance with embodiments, the indicator member may be arranged at the open venting pipe section of the venting pipe.

In accordance with embodiments, the open venting pipe section and the filling head may be integrated to form form a unitary structural unit. Alternatively, the open venting pipe section may form a part of the filling head of the filling pipe. In particular, the filling head may thus be a component, into which are integrated the functions of filling through a filling opening, exiting from the venting pipe, the indicator member for "tank full" indication and/or aeration and venting, for example, via an overpressure relief valve and underpressure relief valve.

In accordance with embodiments, a viewing window may be arranged on the open venting pipe section and/or on the filling head, so that the indicator member is clearly visible from the outside, in particular, by a refueller.

In accordance with embodiments, a container device comprises a liquid container and a filling device, as described above, whereby the filling pipe and the venting pipe discharge into the liquid container.

DRAWINGS

Embodiments will be illustrated by way of example in the drawings and explained in the description below.

FIG. 1 illustrates a schematic sectional view of a filling device and container device, in accordance with embodiments.

DESCRIPTION

As illustrated in FIG. 1, a filling device in accordance with embodiments, may comprise a filling pipe 2 for fluidic connection to the liquid container 1. The filling pipe 2 has a first filling pipe end that is configured to extend into a liquid container 1 to facilitate flow of a liquid 11 into the liquid container 1. In the illustrated embodiment, the liquid container 1 defines a space that may contain the liquid 11 and a gas space 12 (e.g., an air space) spatially above the liquid 11. The liquid container 1 is thus not filled with liquid 11 in the gas space 12.

At a second filling pipe end of the filling pipe 2 opposite to the first filling pipe end, a filling head 3 is arranged which faces away from the liquid container 1. The filling device further comprises a venting pipe 4 for venting the liquid container 1. The venting pipe 4 includes a first venting pipe end that extends into the liquid container 1 and a second or open venting pipe end 5 which faces away from the liquid container 1. The open venting pipe section 5 is fluidically connected to the filling head 3, so that gas may make its way into the environment from the liquid container 1 through the venting pipe 4 and onwards through a filling opening of the filling head 3.

Filling of the liquid container 1 via a canister 13 through a filling opening of the filling head 3 is represented schematically at the filling head.

The filling device comprises an indicator member 6 configured to indicate a status or filling condition of the liquid container 1. In the illustrated embodiment, the indicator member 6 may be in the form of a wind wheel or a blade wheel. During filling of the liquid container 1 in a normal state in which the liquid container 1 is not full, the indicator member 6 may be impinged by a force of outflowing air through the venting pipe 4, so that the wind wheel assumes a first recognizable condition, as a result of which the wind wheel may rotate. During filling of the liquid container 1 in a "container full" condition of the liquid container 1, the indicator member 6 is not impinged by a force of outflowing air through the venting pipe 4. In such a case, the indicator member 6 assumes a second recognizable condition which is different from the first recognizable condition, as a result of which the wind wheel does not rotate or rotates noticeably more slowly.

The indicator member 6 is arranged in the open venting pipe section 5 of the venting pipe 4. This open venting pipe section 5 is formed on the filling head 3 and merges into the filling head 3, so that the open venting pipe section 5 may be seen as a part of the filling head 3.

A viewing window 10 may be arranged at open venting pipe end section 5 and/or the filling head 3, so that the indicator member 6 is visible to an observer outside of the filling device.

An aeration and venting device is arranged on the filling head 3, in particular, an overpressure relief valve 8 and an underpressure relief valve 9. These valves may also be equipped with a dust filter.

At the first venting pipe end, a float valve 7 is arranged between the liquid container 1 and the venting pipe 4, so that in a normal condition in which the level of the liquid 11 is sufficiently low for the float valve 7 not to be closed, the float valve 7 is open and air is able to escape from the liquid container 1 into the venting pipe 4. As a result, the wind wheel is caused to rotate as an indicator member 6 and a normal filling procedure is indicated in the viewing window 10.

In the "container full" condition, in which the liquid 11 presses the float of the float valve 7 against its valve seat and in so doing closes it, the float valve 7 is closed and air is unable to escape from the liquid container 1 into the venting pipe 4. As a result, the wind wheel as an indicator member 6 is not caused to rotate or is caused to rotate at a noticeably slower rate by incoming air, which is visible through the viewing window 10.

The indicator member 6 may also be a lightweight body, for example, a lightweight ball. The ball, when it is not subjected to a flow of escaped air, falls from a raised position into a rest position.

In accordance with embodiments, the filling device and the liquid container 1 collectively form a container device, into which the filling pipe 2 and the venting pipe 4 discharge.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 liquid container
2 filling pipe
3 filling head
4 venting pipe
5 open venting pipe section
6 indicator member
7 float valve
8 overpressure relief valve
9 underpressure relief valve
10 viewing window
11 liquid
12 gas space
13 canister

What is claimed is:

1. A filling device for a liquid container, the filling device comprising:
   a filling pipe configured to extend into the liquid container for fluidic connection to the liquid container;
   a filling head operatively connected to the filling pipe;
   a venting pipe configured to vent the liquid container, the venting pipe having an open venting pipe section at an end thereof to permit a flow of air to exit from the liquid container through the venting pipe; and
   an indicator member, arranged in the open venting pipe section, wherein the indicator member is located outside the filling head, configured to visually indicate, during a filling sequence of the liquid container, a filling condition of the liquid container by assuming a first visually recognizable condition to indicate the liquid container is not full of liquid, or assuming a second visually recognizable condition different from the first visually recognizable condition to indicate the liquid container is full of liquid, such that the indicator member assumes the first visually recognizable condition by being impinged by force of a flow of air during the exit of the flow of air from the venting pipe, and assumes the second visually recognizable condition by not being impinged by force of a flow of air.

2. The filling of claim 1, further comprising a float valve arranged between the liquid container and the venting pipe.

3. The filling of claim 2, wherein in the normal condition, the float valve is configured to open and facilitate the flow of air to escape from the liquid container through the venting pipe.

4. The filling of claim 2, wherein in the full condition of the liquid container, the float valve is configured to close and not facilitate a flow of air to escape from the liquid container through the venting pipe.

5. The filling of claim 1, wherein the indicator member comprises a wind wheel, and the first visually recognizable condition is a standstill or a rotation of the wind wheel at a first rate, and the second visually recognizable condition is a rotation or a rotation of the wind wheel at a second rate that is greater than the first rate.

6. The filling of claim 1, wherein the first visually recognizable condition is a first position of the indicator member and the second visually recognizable condition is a second position of the indicator member that is different from the first position.

7. The filling of claim 1, wherein the open venting pipe section is fluidically connected to the filling head.

8. The filling of claim 1, further comprising wherein an aeration and venting device arranged on the filling head.

9. The filling of claim 8, wherein the aeration and venting device comprises an overpressure relief valve and/or an underpressure relief valve.

10. The filling of claim 1, further comprising a viewing window to facilitate viewing of the indicator member from the outside by an observer, wherein:
    the viewing window is arranged on the open venting pipe section.

11. A filling device for a liquid container, the filling device comprising:
    a filling pipe configured to extend into the liquid container for fluidic connection to the liquid container;
    a filling head assembly that includes a filling head operatively connected to the filling pipe, the filling head having a venting pipe configured to vent the liquid container, the venting pipe having an open venting pipe section at an end thereof to permit a flow of air to exit from the liquid container through the venting pipe, and an indicator member, arranged in the open venting pipe section, wherein the indicator member is located outside the filling head, configured to visually indicate, during a filling sequence of the liquid container, a filling condition of the liquid container by assuming a first visually recognizable condition to indicate the liquid container is not full of liquid, or assuming a second visually recognizable condition different from the first visually recognizable condition to indicate the liquid container is full of liquid, such that the indicator member assumes the first visually recognizable condition by being impinged by force of a flow of air during the exit of the flow of air from the venting pipe, and assumes the second visually recognizable condition by not being impinged by force of a flow of air.

12. The filling of claim 11, further comprising a float valve arranged between the liquid container and the venting pipe, wherein:
   in the normal condition, the float valve is configured to open and facilitate a flow of air to escape from the liquid container through the venting pipe, and
   in the full condition of the liquid container, the float valve is configured to close and not facilitate a flow of air to escape from the liquid container through the venting pipe.

13. The filling of claim 11, wherein the indicator member comprises a wind wheel, and the first visually recognizable condition is a standstill or a rotation of the wind wheel at a first rate, and the second visually recognizable condition is a rotation or a rotation of the wind wheel at a second rate that is greater than the first rate.

14. The filling of claim 11, wherein the first visually recognizable condition is a first position of the indicator member and the second visually recognizable condition is a second position of the indicator member that is different from the first position.

15. The filling of claim 11, further comprising wherein an aeration and venting device arranged on the filling head.

16. The filling of claim 15, wherein the aeration and venting device comprises an overpressure relief valve and/or an underpressure relief valve.

17. The filling of claim 11, wherein the filling head assembly further comprises a viewing window to facilitate viewing of the indicator member from the outside by an observer, wherein: the viewing window is arranged on the open venting pipe section.

18. A container system, comprising:
   a liquid container; and
   a filling device including:
      a filling pipe configured to extend into the liquid container for fluidic connection to the liquid container;
      a filling head operatively connected to the filling pipe;
      a venting pipe configured to vent the liquid container, the venting pipe having an open venting pipe section at an end thereof to permit a flow of air to exit from the liquid container through the venting pipe; and
      an indicator member, arranged in the open venting pipe section, wherein the indicator member is located outside the filling head, configured to visually indicate, during a filling sequence of the liquid container, a filling condition of the liquid container by assuming a first visually recognizable condition to indicate the liquid container is not full of liquid, or assuming a second visually recognizable condition different from the first visually recognizable condition to indicate the liquid container is full of liquid, such that the indicator member assumes the first visually recognizable condition by being impinged by force of a flow of air during the exit of the flow of air from the venting pipe, and assumes the second visually recognizable condition by not being impinged by force of a flow of air.

\* \* \* \* \*